United States Patent
Esnault

(10) Patent No.: US 9,742,346 B2
(45) Date of Patent: Aug. 22, 2017

(54) METHOD OF DISCHARGING AT LEAST ONE ELECTRICAL ENERGY STORAGE UNIT, IN PARTICULAR A CAPACITOR, OF AN ELECTRICAL CIRCUIT

(71) Applicant: Valeo Systemes de Controle Moteur, Cergy Saint Christophe (FR)

(72) Inventor: Eric Esnault, Guyancourt (FR)

( * ) Notice: Subject to any disclaimer, the term of this patent is extended or adjusted under 35 U.S.C. 154(b) by 0 days.

(21) Appl. No.: 15/026,652

(22) PCT Filed: Oct. 1, 2013

(86) PCT No.: PCT/FR2013/052327
§ 371 (c)(1),
(2) Date: Apr. 1, 2016

(87) PCT Pub. No.: WO2015/049427
PCT Pub. Date: Apr. 9, 2015

(65) Prior Publication Data
US 2016/0241185 A1 Aug. 18, 2016

(51) Int. Cl.
*H02P 31/00* (2006.01)
*H02M 1/32* (2007.01)
*B60L 11/18* (2006.01)

(52) U.S. Cl.
CPC ............. *H02P 31/00* (2013.01); *B60L 11/18* (2013.01); *H02M 1/32* (2013.01); *B60L 2270/00* (2013.01); *H02M 2001/322* (2013.01)

(58) Field of Classification Search
CPC ...................................................... H02P 31/00
USPC .......................................... 318/139, 34, 558
See application file for complete search history.

(56) References Cited

U.S. PATENT DOCUMENTS

| 5,780,980 A * | 7/1998 | Naito ....................... B60K 6/28 307/19 |
| 6,204,627 B1 * | 3/2001 | Watanabe ................. B04B 9/10 318/729 |
| 7,652,858 B2 | 1/2010 | Tang et al. |
| 8,669,673 B2 * | 3/2014 | Yamashita ........... B62D 5/0457 180/404 |

(Continued)

FOREIGN PATENT DOCUMENTS

DE 102011089316 A1 6/2013
JP 2003348856 A 12/2003

OTHER PUBLICATIONS

International Search Report issued in corresponding application No. PCT/FR2013/052327 mailed Jun. 5, 2014 (4 pages).

*Primary Examiner* — David S Luo
(74) *Attorney, Agent, or Firm* — Osha Liang LLP

(57) ABSTRACT

Method of discharging at least one electrical energy storage unit of an electrical circuit (1), the electrical circuit (1) furthermore comprising a switching system (2) comprising a plurality of arms (3) each extending in parallel between a positive conductor (4) and a negative conductor (5) of a DC bus (7), each arm (3) comprising in series at least two switching cells (10), in which method, to discharge the capacitor (20, 40), a short-circuit between the positive conductor (4) and the negative conductor (5) of the DC bus (7) is produced in at least two of the arms (3) of the switching system (2) so as to allow the discharge current ($I_{DC}$) of the electrical energy storage unit to flow from said positive conductor (4) to said negative conductor (5).

13 Claims, 3 Drawing Sheets

(56) References Cited

U.S. PATENT DOCUMENTS

Figure 1:
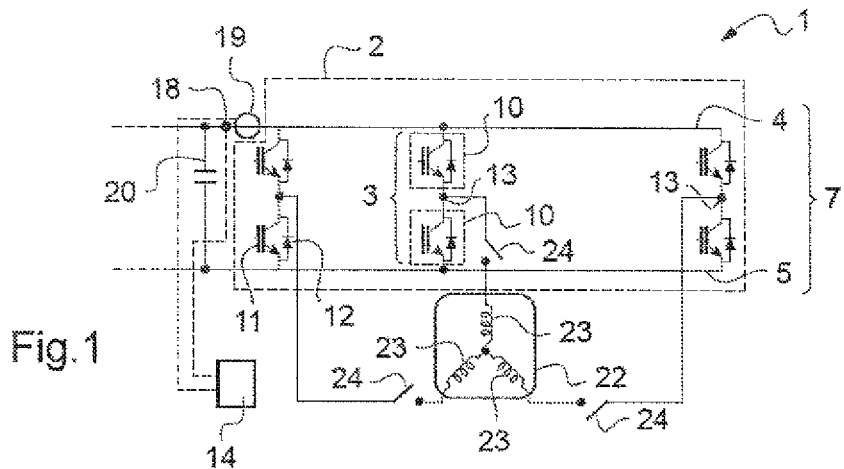

| | | | |
|---|---|---|---|
| 2009/0195199 A1* | 8/2009 | Ito | B60L 3/003 318/400.22 |
| 2010/0213904 A1 | 8/2010 | Yamada | |
| 2011/0080149 A1 | 4/2011 | Fukuta et al. | |

* cited by examiner

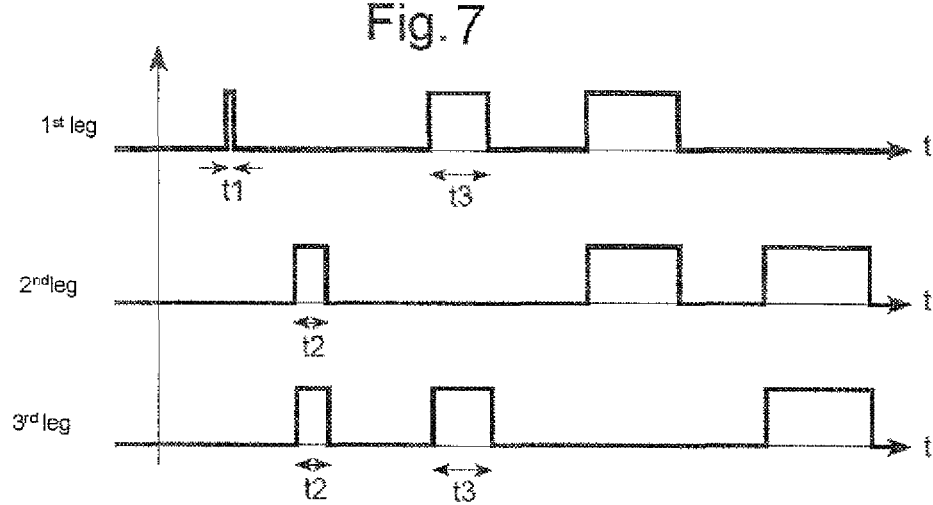

METHOD OF DISCHARGING AT LEAST ONE ELECTRICAL ENERGY STORAGE UNIT, IN PARTICULAR A CAPACITOR, OF AN ELECTRICAL CIRCUIT

The present invention relates to the discharging of at least one electrical energy storage unit, in particular a capacitor, of an electrical circuit.

The invention is particularly applicable to an electrical circuit comprising an electrical winding of a rotating motor. This electrical circuit may be used to propel a vehicle, such as an automobile, with the aid of an electric motor.

The electrical circuit comprises at least one electrical energy storage unit, such as a capacitor, the discharging of which is desirable, for example in order to comply with the requirements of the EN 50178 standard of 1997: "Electronic equipment for use in power installations". The voltage across the terminals of this electrical energy storage unit may be perceptible between terminals of the electrical circuit that are accessible from the exterior and the existence of this voltage may pose a danger to an operator, such as a mechanic for example.

In the aforementioned automotive application, it is known practice to discharge one or more capacitors using (a) bleeder resistor(s) connected to the electrical circuit and dedicated to this discharging operation. This solution increases the number of components of the electrical circuit and thus it is costly.

Also known, for example from the patent U.S. Pat. No. 7,652,858, is a method for discharging a capacitor through the stator electrical winding of a rotating electric motor. This solution is currently relatively complex to implement, as it is necessary to avoid the generation of unwanted torque by the discharge current, especially when the motor comprises a permanent magnet rotor.

Also known, from the applications US 2009/0195199 and US 2010/0213904, is the discharging of a capacitor into a single shortened leg of a three-phase inverter or into a DC-DC voltage converter. These solutions have the drawbacks of degrading the electrokic components of the inverter or of the DC-DC voltage converter and/or of reducing their lifespan.

There is a need for a simple, inexpensive and effective way to discharge the electrical energy storage unit(s), for example the capacitors, of an electrical circuit comprising a switching system and, as the case may be, a stator electrical winding of a rotary electric motor, said circuit being in particular a circuit used in the propulsion of a hybrid or electric vehicle.

An aim of the invention is to respond to this need and it achieves this, according to one of its aspects, using a method for discharging at least one electrical energy storage unit, in particular a capacitor or a standalone source of electrical energy, of an electrical circuit, the electrical circuit furthermore comprising a switching system comprising a plurality of legs each extending in parallel between a positive conductor and a negative conductor of a DC bus, each leg comprising at least two switching cells in series, in which method, in order to discharge the electrical energy storage unit, in particular the capacitor, a short circuit is produced, in at least two of the legs of the switching system, between the positive conductor and the negative conductor of the DC bus, so as to allow the discharge current from the electrical energy storage unit to flow from said positive conductor to said negative conductor.

According to the above method, during the discharging of the electrical energy storage unit(s), at least two different legs of the switching system form a short circuit through which the discharge current flows. The discharging of the electrical energy storage unit into the stator electrical winding is thereby avoided, as is having to carry out a relatively complex control so as not to generate unwanted torque. The dissipation of power may be carried out in the switching cells of the shorted legs.

The above method may also make it possible to avoid adding specific components for discharging the electrical energy storage unit(s).

In contrast to the solutions expounded in the applications US 2009/0195199 and US 2010/0213904, according to which the discharge current always flows into the same switching cells in the event of a short circuit, the above method makes it possible to avoid putting a strain on only one leg. The switching cells of the switching system thus do not need to be overdimensioned in order to withstand a short circuit, hence cost is reduced. Moreover, given that multiple legs are called upon during the discharging of the electrical energy storage unit(s), the stress generated by this discharging is distributed between these legs. Thus, less strain is put on each leg and the switching cells thereof are subjected to less damage by the discharging than in the prior art.

According to a first mode of implementation of the above method, a short circuit is produced only in one leg at a time, i.e. the discharge current successively takes different legs during the discharging in order to flow from the positive conductor to the negative conductor of the DC bus. In this way, at a given instant, the discharge current flows from the positive conductor to the negative conductor of the DC bus through one leg only. A "rotating" short circuit is thus produced in the switching system between the positive conductor and the negative conductor of the DC bus. According to this first mode of implementation of the invention, the method may comprise:

a first step in which a short circuit is produced in a first leg of the switching system so that during this first step, the discharge current flows from the positive conductor to the negative conductor of the DC bus only through said first leg, and a second, subsequent, step in which a short circuit is produced in a second leg of the switching system so that during this second step, the discharge current flows from the positive conductor to the negative conductor only through said second leg.

Still according to this first mode of implementation of the invention, the duration for which the first leg forms the short circuit is shorter than the duration for which the second leg forms the short circuit. Each of these durations is, for example, a fraction of the value of the chopping period of the switching system. A single short circuit may be formed per chopping period. The first leg may form the short circuit for a fraction of one given chopping period and the second leg then forms the short circuit for a fraction of another given chopping period, for example the subsequent chopping period.

When the above first step corresponds to the start of the discharging of the electrical energy storage unit, the discharge current flowing through the first leg is large. The short duration for which this first leg is shorted makes it possible to reduce the risk of the switching cells of the first leg being damaged by this discharge current. Subsequent to this first step, the discharge current is smaller, so that during the second step, it may flow in the second leg for longer.

In an example of the first mode of implementation, the switching system comprises three legs, each leg successively forming the short circuit through which the discharge current flows from the positive conductor to the negative conductor of the DC bus.

Each of the legs of the switching system may, at a given instant, form the short circuit through which the discharge current flows from the positive conductor to the negative conductor of the switching system. In a variant, only certain legs of the switching system sequentially form the short circuit through which the discharge current flows from the positive conductor to the negative conductor of the DC bus.

According to the first mode of implementation of the method, the short circuit may be moved between various legs of the switching system according to an ordered sequence and this ordered sequence may be repeated a predefined number of times. For example, in the case of a switching system with three legs, the ordered sequence may correspond to the formation of the short circuit in the first leg only, then in the second leg only, then in the third leg only and this ordered sequence may be repeated at least twice, particularly one hundred times, in order to discharge the electrical energy storage unit.

The electrical energy storage unit may be a capacitor and, before discharging, the initial voltage accumulated across the plates of the capacitor may be around 410 V. The method may be implemented so as to discharge up to 80% of this capacitor's initial charge. The time taken to discharge the capacitor may be between one and ten seconds. In a variant, the electrical energy storage unit is, for example, a stand-alone source of electrical energy, formed in particular by a battery or any assembly of batteries, and the discharging of this source using the above method may take more time.

According to a second mode of implementation of the invention, the method comprises:
  a first step in which a short circuit is produced in a first leg of the switching system so that during this first step, the discharge current flows from the positive conductor to the negative conductor of the DC bus only through said first leg, and
  a second step in which a short circuit is produced both in the first leg and in a second leg so that during this second step, the discharge current flows from the positive conductor to the negative conductor of the DC bus through the first leg and the second leg, said legs then each simultaneously forming a short circuit between the positive conductor and the negative conductor of the DC bus.

The first step may be before or after the second step. According to this second mode of implementation, a short circuit is produced during the first step in the first leg only and, during the second step, the discharge current may be allowed to flow between the positive conductor and the negative conductor by the first leg and the second leg, which each form a short circuit. The short circuit in the second leg, produced simultaneously with that in the first leg, makes it possible to reduce the damage done to the switching cells of the first leg over time.

Also according to this second mode of implementation, the switching system may function according to a chopping period and, during the first step, a short circuit is produced in the first leg for a duration that is a fraction of the value of said period, which is shorter than the duration that is a fraction of the value of said period during which a short circuit is produced both in the first leg and in the second leg. The first step occurs, for example, during a fraction of one given chopping period, while the second step occurs during a fraction of another given chopping period, in particular the preceding or subsequent chopping period.

According to the first or the second mode of implementation of the invention, the discharging of the electrical energy storage unit(s) may be achieved by successively producing multiple short circuits in the switching system between the positive conductor and the negative conductor and, over the course of the discharging, the duration for which each short circuit is produced increases. This increase may be carried out according to a constant factor from one short circuit to the next. The duration for which each short circuit is produced increases, for example, by 1% each time. In a variant, the increase in the duration of the short circuit may be random. As already pointed out, the further the progression of the discharging of the electrical energy storage unit(s), the smaller the discharge current flowing through a leg forming the short circuit, so that the duration of this short circuit may increase.

The switching system may form a DC-AC voltage converter. It is then a polyphase, in particular three-phase, DC-AC voltage converter. This converter may operate as an inverter or a rectifier.

In a variant, the switching system may form at least two interleaved DC-DC voltage converters. The use of interleaved DC-DC voltage converters may allow converters dimensioned for conveying lower levels of electrical power to be used, hence reducing cost.

The switching system may then operate as a step-up or step-down converter.

Each switching cell may be controllable and, in order to form a short circuit in a leg between the positive conductor and the negative conductor of the DC bus, the switching cells of this leg may be controlled. The switching cells are then controlled leg by leg so as to have the discharge current flow from the positive conductor to the negative conductor of the DC bus.

In a variant, each switching cell may be controllable and, prior to the discharging of the electrical energy storage unit, all of the switching cells that are directly connected to the positive or negative conductor of the DC bus are controlled so that they all have the same switching state, in particular so that they are in the closed state. Next, each short circuit is produced by controlling only the switching cells that are directly connected to the negative or positive conductor of the DC bus. According to this variant, only one switching cell per leg is controlled when displacement of the short circuit from one leg of the switching system to the other is desired. Control may then be simplified.

Each switching cell may or may not be identical. Each switching cell may comprise a controllable electronic switch, across the terminals of which a flyback diode is connected in antiparallel.

In a variant, only the switching cells directly connected to the same conductor of the DC bus are controllable.

The controllable electronic switch is, for example, a transistor, in particular a field-effect transistor, a bipolar transistor or an IGBT transistor.

The controllable switches may be dimensioned so as each to convey an electric current with a maximum value equal to 400 A, in particular to 5600 A.

The electrical circuit may comprise a stator electrical winding of a rotating electric motor capable of being connected to the midpoint of each leg of the switching system. When each leg comprises only two switching cells, the midpoint is positioned between the two switching cells. The rotating electric motor is, for example, polyphase, in particular three-phase. It may be a synchronous motor, in particular with permanent magnets, an induction motor or a variable reluctance motor. It may also be a DC motor, a linear motor or an electromagnet. This electric motor has, for example, a nominal power of between 1 W and 200 kW.

The stator electrical winding may have coils each forming an electrical phase and these coils may or may not be electrically coupled.

Examples of electrical coupling of coils are star coupling and polygonal coupling (called "delta coupling" for three-phase cases). When the coils are not electrically coupled to one another, no coil has a terminal directly coupled to a terminal of another coil.

Switches may be interposed between each midpoint of the switching system and the stator electrical winding and these switches may disconnect the switching system of the stator electrical winding during the discharging of the electrical energy storage unit.

It is thereby ensured that the discharge current will not flow into the stator electrical winding and that no unwanted torque will be produced by the rotating electric motor. Furthermore, it is then not necessary to connect the switching system to the stator electrical winding in order to ensure that the discharging method functions satisfactorily. Having to use the rotating electric motor in order to test the discharging method is thereby avoided, allowing testing operations to be simpler and in a less congested environment.

When the electrical energy storage unit being discharged is a capacitor, the latter may be connected in parallel with the legs of the switching system.

In a variant or in combination with the above, the electrical circuit furthermore comprises:
- a standalone source of electrical energy, in parallel with which a capacitor is connected, and
- a DC-DC voltage converter interposed between said standalone source of electrical energy and the switching system, the method may make it possible to discharge said capacitor. The switching cells, that is their state, may be controlled in terms of voltage or in terms of current.

The standalone source of electrical energy may be a battery, a supercapacitor or any assembly of batteries or of supercapacitors. It is, for example, multiple parallel-connected branches of batteries in series. This standalone source of electrical energy may have a nominal voltage of between 60 V and 410 V, in particular of between 200 V and 410 V.

When the coils are electrically decoupled, the electrical circuit may comprise a connector capable of being connected to a connector of complementary type of an electrical system in order to charge the standalone source of electrical energy, the connector comprising at least a plurality of contacts, each having a free end and another end connected to an intermediate point of a coil. The electrical system thereby supplies power to each coil via an intermediate point thereof, in particular a midpoint thereof.

Such an electrical circuit may be used for both:
- supplying power to the coils of the stator from the standalone source of electrical energy and through the switching system, used as an inverter, in order to cause the electric motor to rotate, and
- charging the standalone source of electrical energy through the coils of the stator, which are used as inductors, and through the switching system, used as a rectifier.

In a variant, the above electrical circuit is dedicated to the propulsion of the rotating electric motor when it is supplied with power by the standalone source of electrical energy and another circuit is on board the vehicle, this other circuit comprising a connector allowing the standalone source of electrical energy to be charged from an external single-phase, three-phase or DC electrical system.

The discharging method may be controlled depending on the value of the voltage of the DC bus, this voltage being measured between the positive conductor and the negative conductor. A control unit may control the switching cells depending on the value of this voltage in order to form a short circuit in the switching system between the positive conductor and the negative conductor. This control may be carried out in an open loop or in a closed loop.

The electrical circuit may comprise an element for measuring the voltage of the DC bus and, in an open loop, the duty cycle to be applied to the electronic switches of the switching cells may be determined depending on the rate of increase of the voltage of the DC bus.

The electrical circuit may, in a variant, comprise an element for measuring the voltage of the DC bus and an element for measuring the current in the positive conductor of the DC bus immediately upstream of the switching system. The current value provided by this measuring element may make closed-loop control possible by virtue of a comparator system with hysteresis and monitoring of the voltage of the DC bus.

Another subject of the invention, according to another of its aspects, is a method for discharging at least one electrical energy storage unit, in particular a capacitor or a standalone source of electrical energy, of an electrical circuit, the electrical circuit furthermore comprising a switching system comprising a plurality of legs each extending in parallel between a positive conductor and a negative conductor of a DC bus, each leg comprising at least two switching cells in series, the method comprising:
- a first step during which a short circuit is produced in a first leg so as to define a path allowing the discharge current to flow between the positive conductor and the negative conductor of the DC bus, and
- a second step during which a short circuit is produced in a second leg so as to define a path allowing the discharge current to flow between the positive conductor and the negative conductor of the DC bus.

As pointed out previously, a "rotating" short circuit is obtained. The electrical power linked to the discharging of the electrical energy storage unit, in particular the capacitor, is thereby dissipated into at least two legs of the switching system.

During the first step, only the first leg may form a short circuit. In a variant, the second leg or another leg also forms a short circuit during this first step.

During the second step, only the second leg may form a short circuit. In a variant, the first leg or another leg also forms a short circuit during this second step.

All or some of the aforementioned features are applicable to this other aspect of the invention.

In particular, a variant of this aspect of the invention relates to method for discharging at least one electrical energy storage unit, in particular a capacitor or a standalone source of electrical energy, of an electrical circuit, the electrical circuit furthermore comprising a switching system comprising a plurality of legs each extending in parallel between a positive conductor and a negative conductor of a DC bus, each leg comprising at least two switching cells in series, the method comprising:
- a first step during which a short circuit is produced in a first leg and a second leg so as to define a path allowing the discharge current to flow between the positive conductor and the negative conductor of the DC bus, and a second step during which a short circuit is produced in the second leg and another leg so as to define a path allowing the discharge current to flow between the positive conductor and the negative conductor of the DC bus.

A leg is shared between the short circuits produced in the first and second steps. Thus, the number of legs involved in the two short circuits is limited. The switches and/or the legs may vary in terms of their control parameters, thereby making it possible to simplify the control of the switches in the method for discharging the storage unit.

The method may comprise a step prior to the first and second steps in which a short circuit is produced in the first leg of the switching system so that during this first step, the discharge current flows from the positive conductor to the negative conductor of the DC bus only through said first leg. The method may comprise a step prior to the first and second steps in which a short circuit is produced in the third leg of the switching system so that during this first step, the discharge current flows from the positive conductor to the negative conductor of the DC bus only through said third leg.

At the start of the discharging of the storage unit, the energy to be removed is considerable. However, the concurrent control of multiple legs may comprise inconsistencies such as, among others, opening/closing delays between switches of the legs. These inconsistencies, given the considerable energy to be removed, may lead to a surfeit of wear on the switches of the legs. Furthermore, the switches and/or the legs may vary in terms of their control parameters. By first producing a short circuit on a first leg, the risk of the switches of the legs wearing out is reduced and the reliability of the discharging method is increased.

In particular, the short circuit produced in the prior step has a duration that is sufficiently short so as to avoid the occurrence of a large current in the leg used in this prior step. More particularly, the duration of the short circuit of the prior step is between a minimum duration for applying a control signal to a switch of the leg and a maximum duration for opening a switch of the leg, said maximum duration corresponding to a maximum current withstood by the switch. For example, the minimum duration is 400 ns, 500 ns or 600 ns. The maximum duration is 700 ns, 800 ns or even 900 ns.

For example, in this prior step, the first and second steps are implemented one after the other after receiving a signal controlling the discharging of the storage unit.

The invention furthermore relates to a voltage converter, in particular for an air conditioning compressor of a vehicle, comprising:

a switching system comprising a plurality of legs each extending in parallel between a positive conductor and a negative conductor of a DC bus, each leg comprising at least two switching cells in series, and a control unit configured so as to implement a method according to the invention.

The converter may comprise any one of the features previously described that are compatible therewith.

The invention also relates to an electric air conditioning compressor for a vehicle comprising a voltage converter according to the invention.

Figure 2:
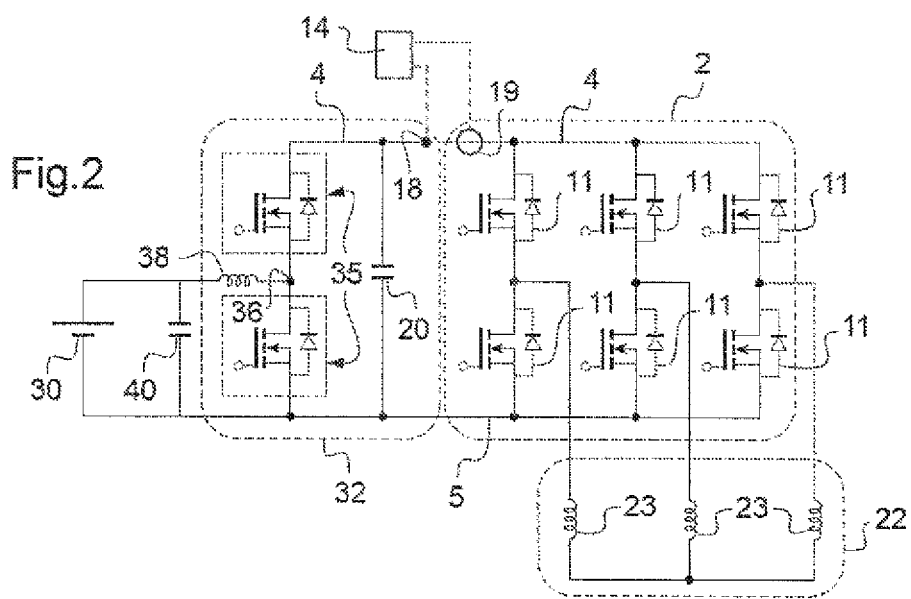
Figure 3:
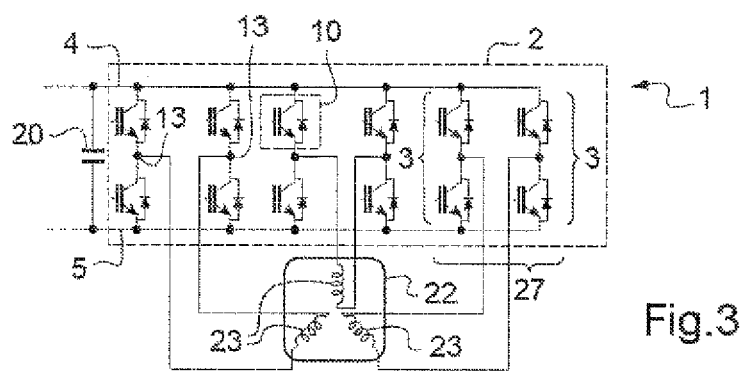
Figure 4:
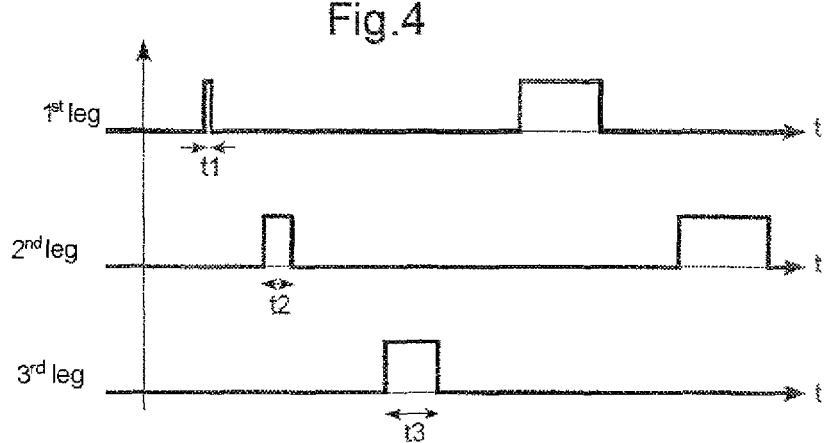
Figure 5:
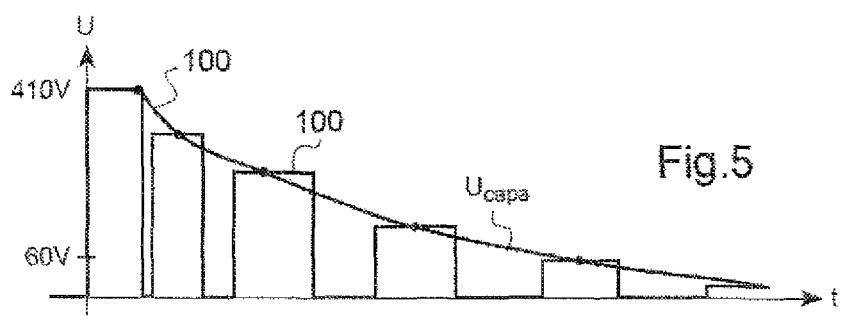
Figure 6:

It will be possible to gain a better understanding of the invention by reading the following description of a non-limiting exemplary implementation thereof and by examining the appended drawings, in which:

FIG. 1 diagrammatically shows part of an electrical circuit in which the method for discharging one or more capacitors may be implemented, FIG. 2 diagrammatically shows an exemplary electrical circuit comprising that shown in FIG. 1, FIG. 3 diagrammatically shows a variant of the circuit shown in FIG. 1, FIG. 4 is a timing diagram showing the control of the legs of the switching system of the circuit of FIGS. 1 to 3 when the discharging method according to one embodiment is implemented, FIGS. 5 and 6 respectively show the voltage and the current at the terminals of the capacitor during discharging thereof, and FIG. 7 is a timing diagram showing the control of the legs of the switching system of the circuit of FIGS. 1 to 3 when the discharging method according to another embodiment is implemented.

FIG. 1 shows part of an electrical circuit in which the discharging method may be implemented. In the example described, the method allows a capacitor to be discharged, but the invention is not limited to such an exemplary component to be discharged.

This circuit 1 comprises a switching system 2 comprising a plurality of legs 3 each extending between a positive conductor 4 and a negative conductor 5 of a DC bus 7.

In the example under consideration, the switching system 2 is a three-phase DC-AC converter, but the invention is not limited to this example. Each leg 3 comprises, in this example, two controllable switching cells 10.

The chopping frequency of the switching system 2 is, for example, 10 kHz. Each switching cell 10 is, for example, formed by a controllable switch 11, in antiparallel with which is connected a flyback diode 12. The switch 11 may be a transistor, in particular a field-effect, bipolar or IGBT-type transistor. Each leg 3 comprises a midpoint 13, positioned between the two switching cells 10.

In the example under consideration, each switching cell 10 is controllable and provision may be made for a centralized control unit 14. This control unit 14 comprises processing means, which may or may not be digital, and can control all of the electronic switches 11.

The control of an electronic switch 11 may be carried out by injecting a current into the control electrode of this switch 11 or by applying an electrical potential to this control electrode.

The control unit 14 comprises, in the example under consideration, one or more microcontrollers and/or one or more field-programmable gate arrays (FPGAs). This control unit 14 may have an element for measuring 18 the voltage of the DC bus 7 and/or an element for measuring 19 the current flowing through the DC bus 7. As shown in FIG. 1, a capacitor 20 is connected in parallel with the legs 3. This capacitor has, for example, a capacitance of between 200 μF and 3500 μF.

In the example of FIG. 1, the circuit 1 comprises a stator electrical winding 22 of a rotating electric motor. This electrical winding 22 is, for example, three-phase, comprising three coils 23 each forming an electrical phase of the stator. Each coil 23 comprises a terminal connected to a midpoint 13 of the switching system 2. This connection may be made, as in the example of FIG. 1, by defeating a switch 24 interposed between each midpoint 13 and the corresponding coil 23.

The rotating electric motor may be a synchronous motor, in particular with permanent magnets, an induction motor or a variable reluctance motor.

In the example of FIG. 1, the coils 23 are electrically coupled in a star formation. The invention is, however, not limited to this mode of electrical coupling or to coils 23 electrically coupled to one another. Thus, FIG. 3 shows a variant of FIG. 1 according to which the coils 23 are not electrically coupled to one another.

In this FIG. 3, it may be noted that no coil 23 has a terminal directly connected, i.e. connected without (an) intermediate component(s), to a terminal of another coil 23 of the stator electrical winding 22.

In this example, the switching system 2 comprises twice as many legs 3 as in that of FIG. 1. Each midpoint 13 of a leg 3 is, in the example of FIG. 3, connected to a respective terminal of one of the coils 23, each coil 23 then being positioned between two midpoints 13 of two separate legs which form an H bridge 27.

No switch 24 is shown in FIG. 3 between the switching system 2 and the stator electrical winding 22, but provision may be made for such switches in order to disconnect the winding 22 from the switching system 2.

An addition to the circuit of FIG. 1 will now be described with reference to FIG. 2, but also relates to the circuit of FIG. 3. A standalone source of electrical energy 30 may be positioned upstream of the capacitor 20 in order to supply power to the stator electrical winding 22 through the switching system 2. This standalone source of electrical energy 30 may be a battery or an association of batteries in parallel and/or in series.

In the example of FIG. 2, the circuit 1 again comprises a DC-DC voltage converter 32. This voltage converter 32 is configured so as to match the value of the voltage delivered by the standalone source of electrical energy 30 to the DC bus 7, and vice versa.

In the example shown, the converter 32 is a reversible current chopper. In a known manner, this chopper 32 comprises two switching cells 35, which may or may not be identical to the switching cells 10 of the switching system 2, and are separated by a middle point 36. The switching cells 35 may be controlled by the control unit 14. Each of these cells 35 is, in the example under consideration, reversible, comprising, in antiparallel, a controllable switch and a diode. An inductor 38 is interposed between this middle point 36 and the standalone source of electrical energy 30.

As shown in FIG. 2, a capacitor 40 may be connected in parallel with the standalone source of electrical energy 30. For safety reasons, during maintenance operations for example, in the event of an accident, or during tests performed in a factory, it may be necessary to discharge the capacitor 20 and/or the capacitor 40.

In the example described below, the discharging of the capacitor 20 is relevant when the voltage across its terminals reaches the value 410 V. Of course, the method that will be expounded below may also be implemented when the aim is to discharge the capacitor 40 instead of, or in addition to, the capacitor 20, or even any other capacitor of the electrical circuit not shown in FIG. 2, or even any other electrical energy storage unit of the electrical circuit 1, for example the standalone source of electrical energy 30.

During the discharging, the stator electrical winding 22 may be disconnected from the rest of the electrical circuit 1 by virtue of the switches 24 which move to the open position. In order to discharge the capacitor 20, each leg 3 of the switching system may successively form a short circuit, as shown in FIG. 4. In this example, a short circuit is first produced in the leftmost leg 3 of the switching system 2 of FIG. 1, referred to as "first leg" hereinafter. In order to produce this short circuit, the two electronic switches 11 of the first leg are ordered to close for a duration t1 that is a fraction of the value of the chopping period. When the first leg forms a short circuit, this leg defines a path along which the discharge current $I_{DC}$ may flow from the positive conductor 4 to the negative conductor 5 for the duration t1. This current $I_{DC}$, also flowing in the DC bus 7, is then equal to the short circuit current $I_{CC1}$ flowing through the first leg, as shown in FIG. 6.

As may also be seen in FIG. 5, the short circuit allows the value of the voltage 100 across the terminals of the capacitor 20 to be reduced. In this FIG. 5, the curve 110 corresponds to the voltage across the terminals of each leg 3.

During the subsequent iteration, a short circuit is next produced in the leg of the middle of the switching system 2 of FIG. 1, again referred to as "second leg" hereinafter. In order to produce this short circuit, the two electronic switches 11 of the second leg 3 are ordered to close for a duration t2, a fraction of the value of the chopping period, during the subsequent chopping period. When the second leg forms the short circuit, this leg defines a path along which the discharge current $I_{DC}$ may flow from the positive conductor 4 to the negative conductor 5 for the duration t2. This current $I_{DC}$, also flowing in the DC bus 7, is then equal to the short circuit current $I_{CC2}$ flowing through the second leg, as shown in FIG. 6.

It may be remarked in FIGS. 5 and 6 that the value of the discharge current $I_{DC}$ is greater when it is flowing in the first leg for the duration t1 than when it is flowing in the second leg for the duration t2. It may also be remarked that the flow of the discharge current $I_{DC}$ in the second leg allows the value of the voltage of the DC bus 7 to be reduced further. As may be seen in FIG. 4, the duration t2 is moreover longer than the duration t1.

When the aim is to carry on with the discharging of the capacitor 20, a short circuit is subsequently produced in the right-hand leg of the switching system of FIG. 1, again referred to as "third leg" hereinafter. In order to produce this short circuit, the two electronic switches 11 of the third leg 3 are ordered to close for a duration t3, a fraction of the value of the chopping period, during the chopping period subsequent to that during which the second leg forms the short circuit. When the third leg forms the short circuit, this leg defines a path along which the discharge current $I_{DC}$ may flow from the positive conductor 4 to the negative conductor 5 for the duration t3. This current $I_{DC}$, also flowing in the DC bus 7, is then equal to the short circuit current $I_{CC3}$ flowing through the third leg, as shown in FIG. 6.

It may be remarked in FIGS. 5 and 6 that the value of the discharge current $I_{DC}$ is greater when it is flowing in the second leg for the duration t2 than when it is flowing in the third leg for the duration t3. It may also be remarked that the flow of the discharge current $I_{DC}$ in the third leg allows the value of the voltage of the DC bus 7 to be reduced further. As may be seen in FIG. 4, the duration t3 is moreover longer than the duration t2, itself longer than the duration t1.

Depending on whether the value of the voltage measured by the measuring element 18 or the current value measured by the measuring element 19 is less than a predefined value, the discharging of the capacitor 20 may or may not be continued.

The leg 3 of the switching system 2 may successively be ordered to short anew, in the same order as that just shown, each time with a short circuit duration that increases from one iteration to another.

The above discharging may be carried out in an open loop, i.e. the control unit 14 controls the controllable electronic switches 11 by applying thereto duty cycle values determined depending on the rate of increase of the voltage of the DC bus 7 that is obtained using the measuring element 18. In this case, it is possible for the element for measuring 19 the current not to be present.

In a variant, the discharging is carried out in a closed loop by virtue of the measuring elements 18 and 19. The current value provided by the current-measuring element 19 may be used by a comparator system with hysteresis and the value of the voltage of the DC bus may be monitored.

The invention is not limited to the exemplary discharging method that was just described.

In another example that is not described, in order to successively form the short circuit, all of the electronic switches 11 that are connected to the positive conductor 4 of the DC bus 7 are first placed in the same state, e.g. closed. In order to form a short circuit in one leg, the electronic switch of this leg that is connected to the negative conductor 5 of the DC bus is ordered to close.

In other examples, the control of the electronic switches 11 carried out by the control unit 14 may be carried out in a closed loop (see FIG. 8).

In still other examples, the switching system is different, comprising, for example, a different number of legs or being an interleaved DC-DC converter.

The expression "comprising one" must be understood as being synonymous with the expression "comprising at least one", except when stated otherwise.

In a particular example, the switching system 2 of the circuit 1 illustrated in FIGS. 1, 2 and 3 may be a voltage converter, for example a DC-AC converter, for controlling an electric motor of an air conditioning compressor, in particular for a vehicle.

FIG. 7 illustrates another exemplary method for discharging the capacitor 20, which will be described while paying particular attention to the differences over the example of FIG. 4.

A short circuit is first produced in the leftmost leg 3. However, during the subsequent iteration and in contrast to the example illustrated in FIG. 4, a short circuit is simultaneously produced in the second and third legs of the switching system 2 for the duration t2, a fraction of the value of the chopping period. The two legs define paths along which the discharge current $I_{DC}$ may flow from the positive conductor 4 to the negative conductor 5 for the duration t2. The current $I_{DC}$ flowing in the DC bus 7 is then equal to the sum of the short circuit currents $I_{CC2}$, $I_{CC3}$ flowing through the second and third legs. By making the discharge current $I_{DC}$ flow in two legs, the total duration of discharging is reduced with respect to the example of FIG. 4.

When the aim is to carry on with the discharging of the capacitor 20, a short circuit is subsequently produced in the third and first legs for a duration t3, a fraction of the chopping period. During the subsequent iteration, a short circuit may be produced in the first leg and the second leg.

Depending on whether the value of the voltage measured by the measuring element 18 or the current value measured by the measuring element 19 is less than a predefined value, the discharging of the capacitor 20 may or may not be continued. The legs 3 of the switching system 2 may successively be ordered to short anew, two at a time, in the same order as that just described, each time with a short circuit duration that increases from one iteration to another as explained for the example illustrated in FIG. 4.

In the example illustrated in FIG. 7, the duration t1 of closing for the two electronic switches 11 of the first leg is equal to 700 ns. From 0 to 500 ns, a closing signal is applied to the switches of the legs. After 500 ns, it is certain that the switches are closed. The discharge current $I_{DC}$ gradually increases in the first leg until reaching around 2800 A after 200 ns. The switches are then opened in order to avoid a current of higher intensity, which would be damaging to them.

In order to discharge the capacitor 20, each leg 3 of the switching system may successively form a short circuit, as shown in FIG. 4. In this example, a short circuit is first produced in the leftmost leg 3 of the switching system 2 of FIG. 1, referred to as "first leg" hereinafter. In order to produce this short circuit, the two electronic switches 11 of the first leg are ordered to close for a duration t1 that is a fraction of the value of the chopping period. When the first leg forms a short circuit, this leg defines a path along which the discharge current $I_{DC}$ may flow from the positive conductor 4 to the negative conductor 5 for the duration t1. This current $I_{DC}$, also flowing in the DC bus 7, is then equal to the short circuit current $I_{CC1}$ flowing through the first leg, as shown in FIG. 6.

The invention claimed is:

1. A method for discharging at least one electrical energy storage unit comprising, a capacitor or a standalone source of electrical energy of an electrical circuit, the electrical circuit further comprising a switching system comprising a plurality of legs each extending in parallel between a positive conductor and a negative conductor of a DC bus, each leg comprising at least two switching cells in series, the method comprising:
   a first step during which a short circuit is produced in a first leg and a second leg so as to define a path allowing the discharge current to flow between the positive conductor and the negative conductor of the DC bus; and
   a second step during which a short circuit is produced in the second leg and another leg so as to define a path allowing the discharge current to flow between the positive conductor and the negative conductor of the DC bus.

2. The method as claimed in claim 1, further comprising:
   a step prior to the first and second steps in which a short circuit is produced in the first leg of the switching system so that during the first step, the discharge current flows from the positive conductor to the negative conductor of the DC bus only through said first leg.

3. The method as claimed in claim 1, further comprising:
   a step prior to the first and second steps in which a short circuit is produced in a third leg of the switching system so that during the first step, the discharge current flows from the positive conductor to the negative conductor of the DC bus only through said third leg.

4. The method as claimed in claim 1, in which the discharging of the electrical energy storage unit is carried out by successively producing multiple short circuits in the switching system between the positive conductor and the negative conductor of the DC bus, wherein as the electrical energy storage unit is being discharged, the duration for which each short circuit is produced increases.

5. The method as claimed in claim 1, in which the switching system forms a DC-AC voltage converter.

6. The method as claimed in claim 1, in which the switching system forms at least two interleaved DC-DC voltage converters.

7. The method as claimed in claim 1, in which each switching cell is controllable, wherein to form a short circuit in a leg between the positive conductor and the negative conductor of the DC bus, the switching cells of the corresponding leg are controlled.

8. The method as claimed in claim 1, in which each switching cell is controllable, wherein prior to the discharging of the electrical energy storage unit, all of the switching cells directly connected to the positive or negative conductor of the DC bus are controlled in such a way that they all have the same switching state and in which each short circuit is produced by controlling only the switching cells directly connected to the negative or positive conductor of the DC bus.

9. The method as claimed in claim 1, in which the electrical circuit further comprises a stator electrical winding of a rotating electric motor capable of being connected to the midpoint of each leg of the switching system.

10. The method as claimed in claim 9, in which a switch is interposed between each midpoint of the switching system and the stator electrical winding, wherein the switches disconnect the switching system from the stator electrical winding during the discharging of the electrical energy storage unit.

11. The method as claimed in claim 1, in which a capacitor is connected in parallel with the legs of the switching system and in which said capacitor is discharged.

12. The method as claimed in claim 1, in which the electrical circuit further comprises a standalone source of electrical energy in parallel with which a capacitor is connected, and a DC-DC voltage converter interposed between said standalone source of electrical energy and the switching system, in which method said capacitor is discharged.

13. A voltage converter for an air conditioning compressor of a vehicle, comprising:
   a switching system comprising a plurality of legs each extending in parallel between a positive conductor and a negative conductor of a DC bus, each leg comprising at least two switching cells in series, and
   a control unit configured so as to implement a method as claimed in claim 1.

* * * * *